Patented Sept. 27, 1927.

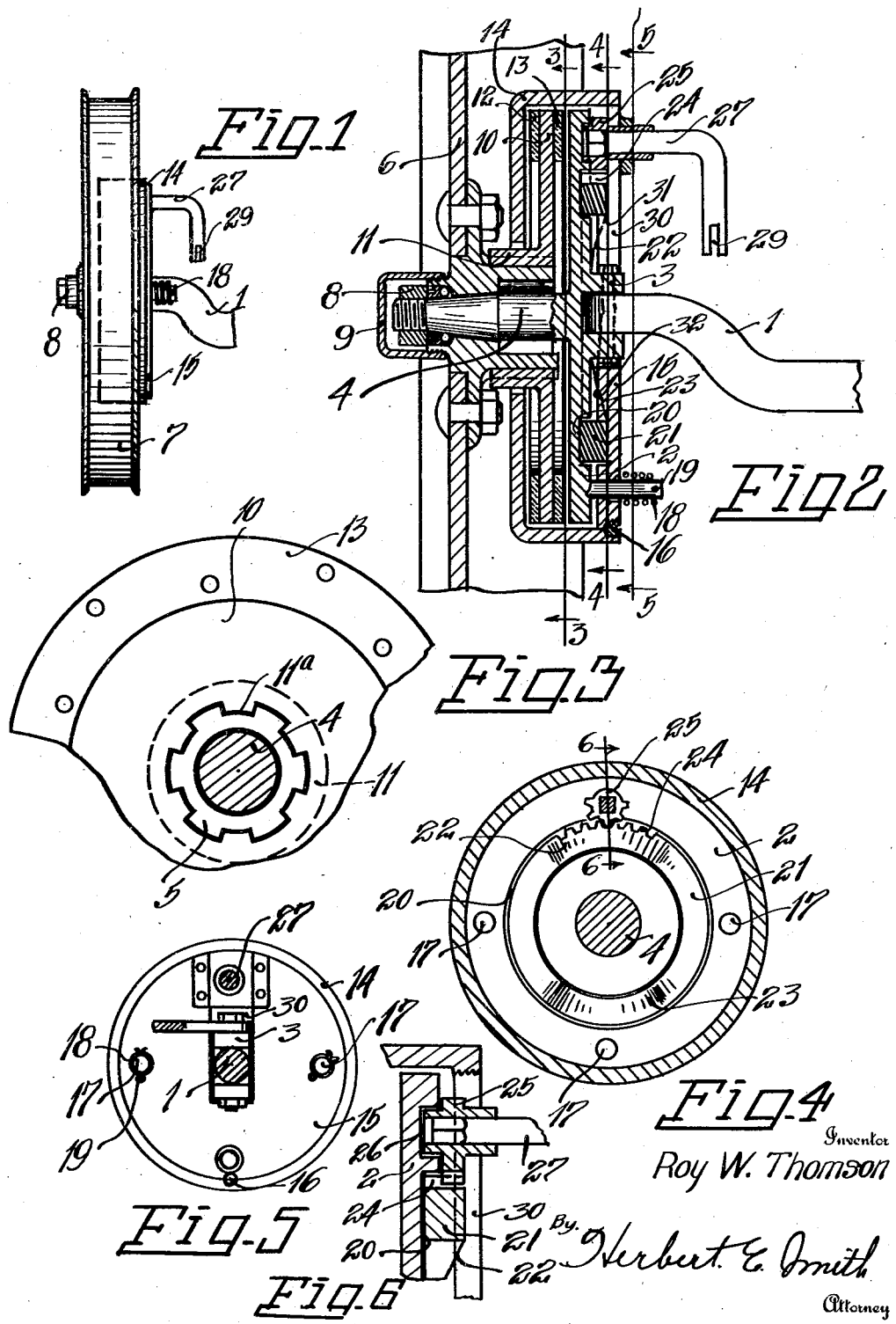

1,643,354

UNITED STATES PATENT OFFICE.

ROY W. THOMSON, OF WALLACE, IDAHO, ASSIGNOR OF ONE-HALF TO RALPH BERG, OF SPOKANE, WASHINGTON.

FRICTION BRAKE.

Application filed May 22, 1926. Serial No. 110,973.

My present invention relates to improvements in friction brakes especially adapted for use on the wheels of automotive vehicles with the front wheels as well as with the rear driving wheels of the vehicle for control of the movement of the vehicle.

The brake is of the manually controlled, or pedal controlled type and involves the use of a non-rotatable brake housing which is longitudinally movable with relation to the axis of the wheel journal for frictionally engaging said housing and a rotatable friction disk carried by the wheel. A rotary cam device is employed for operating the braking devices, and means actuated from a lever, pedal, or other suitable source of power, are employed for actuating the operating devices. The invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

While the exemplified structure illustrates one form of my invention, it will be understood that various changes and alterations may be made therein within the scope of my claims without departing from the principles of my invention.

Figure 1 is an edge view of an automotive vehicle wheel with the tire omitted in which the improvements of my invention are embodied.

Figure 2 is an enlarged, detail sectional view at the hub portion of the wheel showing the friction members and operating parts of the brake.

Figure 3 is a sectional view at line 3—3 of Figure 2 showing the wheel journal and part of the rotary friction disk.

Figure 4 is a sectional view at line 4—4 of Figure 2 showing the friction cam-ring and operating means.

Figure 5 is a view at line 5—5 of Figure 2 at the exterior of the non-rotatable housing.

Figure 6 is an enlarged, vertical, sectional detail view at line 6—6 of Figure 4.

While I have shown in the drawings the braking mechanism applied to one of the front steering wheels of an automotive vehicle, it will be understood that the mechanism may be duplicated on the driving wheels at the rear of the vehicle, as well as on both front wheels. In the form of the invention illustrated I have designated the front axle as 1 and a non-rotatable disk 2 is pivoted thereon with a knuckle joint as 3 of usual type to permit steering with the front wheel. The wheel journal 4 is fashioned integral with the non-rotatable disk and the hub 5 of the wheel 6 is provided with suitable bearings on the journal. A channel rim 7 is shown on the wheel, the tire being omitted for convenience of illustration, and the usual lock nut 8 and cap 9 are employed for retaining the wheel on its journal.

At the inner side of the wheel is carried a friction disk 10 having a hub 11 which is keyed or splined at 11ª to the wheel hub 5 to rotate with the wheel, and at the sides of this disk are provided friction rings 12 and 13 of fiber or other suitable material adapted to form bearing faces.

The non-rotatable disk 2 and the rotatable disk 10 with its bearing rings 12 and 13 are enclosed within a flanged cup or brake housing 14 which has a central opening and surrounds the concentric hubs 5 and 11. At its inner open side the housing is provided with a closure plate 15 which is secured to the housing in a suitable manner and a set screw or set screws 16 may be used to lock the plate to its housing and thus form an oil and dust proof enclosed for the braking device.

The housing is supported on the non-rotatable disk 2 by means of a number of studs 17 (three of which are shown) integral with the disk and protruding through complementary openings in the closure plate. Springs 18 are coiled about the studs and interposed between cotter pins 19 at the ends of the studs and the outer face of the closure plate, to exert their tension for the purpose of urging the plate (and housing) outwardly toward the wheel.

On its face adjacent the cover plate the non-rotatable disk 2 is fashioned with an annular groove 20, and a relatively movable cam-ring 21 is seated in this groove and provided with cam or wedge faces 22 and 23 at diametrically opposite points on the ring and facing the cover plate.

At a convenient location on the periphery of the cam ring is arranged an arcuate rack 24, and a pinion 25 engages the rack for turning the ring when the pinion is turned. The pinion has a bearing 26 in the disk 2, and the crank shaft 27 of the pinion has a bearing plate 28 (as seen in Fig. 5) fastened to the outer face of the disk or cover plate 15. The slotted end 29 of the crank shaft 27 is linked in suitable manner to the actuating mechanism, as a lever or pedal (not shown) for turning the pinion, which in turn rotates the cam ring through an arc of the required length.

The closure plate or cover plate 15 is fashioned with a slot 30 as best seen in Figure 5 to accommodate the connections to the braking mechanism.

On the inner face of the cover plate are arranged a pair of arcuate cam faces 31 and 32 in position for co-action, with the complementary cam faces 22 and 23 of the cam ring.

With the wheel and its disk 10 revolving under normal conditions the bearing rings 12 and 13 remain out of contact with the inner face of the housing and the adjoining inner face of the non-rotatable disk 2. For applying the brake, the pinion is turned through the crank shaft to partially rotate the cam-ring causing engagement of the cam faces 22—31 and 23—32 and the action of the cams or wedges moves the housing to clamp or partially clamp the bearing rings 12 and 13 between the housing and the disk 2, thus retarding or stopping the revolutions of the disk 11 and the wheel. When the brake is released by restoring the cams to normal position the springs 18 move the housing to the left in Figure 2 to disengage the frictionally engaged parts of the brake.

Having thus fully described my invention, what I claim as new and desire to secure by Letters Patent is—

1. In a wheel brake, the combination with a non-rotatable disk having an annular groove, a cam ring therein, and a rotatable disk having friction-rings at its opposite sides, of a movable housing for said disks, cam devices carried by the housing for co-action with the cam ring, and means for partially rotating the cam ring for frictional engagement between said friction rings, the housing and said non-rotatable disk.

2. The combination with a rotatable disk having lateral friction rings, a non-rotatable disk having an annular groove and a cam ring in said groove, of a housing having a rigid cover plate and openings therein, studs on said non-rotatable disk for supporting said plate and housing, and springs on said studs engaging said plate, a cam device on said plate for co-action with said cam ring, and means for partially turning said cam ring.

3. The combination with a wheel and its axially movable disk having lateral bearing rings thereon, of a journal having a rigid non-rotatable disk, a housing for said disks and a perforated cover plate secured to the housing, supporting studs on the non-rotatable disk for said plate and springs on said studs engaging said plate, a cam ring carried by the non-rotatable disk and complementary cam faces on said plate, an arcuate rack on said ring, a pinion engaging said rack and means for partially turning the pinion.

In testimony whereof I affix my signature.

ROY W. THOMSON.